Nov. 7, 1961 R. H. JONES ET AL 3,007,631

DATA STORAGE AND READOUT UNIT FOR ACCOUNTING MACHINES

Filed March 12, 1957 6 Sheets-Sheet 1

INVENTORS.
RICHARD H. JONES
ROBERT S. BRADSHAW

BY [signature]

AGENT

Nov. 7, 1961 R. H. JONES ET AL 3,007,631

DATA STORAGE AND READOUT UNIT FOR ACCOUNTING MACHINES

Filed March 12, 1957 6 Sheets-Sheet 2

INVENTORS.
RICHARD H. JONES
ROBERT S. BRADSHAW
BY
AGENT

DATA STORAGE AND READOUT UNIT FOR ACCOUNTING MACHINES

Filed March 12, 1957 6 Sheets-Sheet 3

INVENTORS.
RICHARD H. JONES
ROBERT S. BRADSHAW
BY H. Walter Irwin
AGENT

INVENTORS

RICHARD H. JONES
ROBERT S. BRADSHAW

BY H. Walter [signature]

AGENT

DATA STORAGE AND READOUT UNIT FOR ACCOUNTING MACHINES

Filed March 12, 1957 6 Sheets-Sheet 5

INVENTORS.
RICHARD H. JONES
ROBERT S. BRADSHAW
BY H. Walter Lim
AGENT

DATA STORAGE AND READOUT UNIT FOR ACCOUNTING MACHINES

Filed March 12, 1957 6 Sheets-Sheet 6

INVENTORS.
RICHARD H. JONES
ROBERT S. BRADSHAW
BY H. Walter [signature]
AGENT

United States Patent Office 3,007,631

Patented Nov. 7, 1961

3,007,631

DATA STORAGE AND READOUT UNIT FOR ACCOUNTING MACHINES

Richard H. Jones, Bridgeport, and Robert S. Bradshaw, Broomall, Pa., assignors to Burroughs Corporation, Detroit, Mich., a corporation of Michigan Filed Mar. 12, 1957, Ser. No. 645,537
17 Claims. (Cl. 235—60)

The present invention relates to data storage apparatus and more particularly to apparatus for setting circuit controlling switches mechanically according to coded information transmitted by an accounting machine to store such information for electrical read-out ready for use when needed.

In many calculating devices, business machines and the like, it is desirable to be able to index information into a machine, store, and read or transfer this same information out of the machine or to another part of the same machine at will. It is also desirable that the information be in a form which is readily available for use and which can be utilized with more than one machine without costly and complex translational apparatus being necessary. Further it is desirable that the transfer of the stored information be made simply and instantaneously and that a precise electrical or mechanical correspondence exist between the machine elements supplying the original information and the machine elements of the unit into which the information is to be introduced.

Generally, it is an object of this invention to provide simple and relatively inexpensive means for storing and transferring information.

More specifically, it is an object of the invention to provide a mechanism operating in response to the setting of a program unit of an accounting machine for selectively controlling the positioning of separate banks of electrical switches for actuation by the mechanism of an accounting machine.

Another object of the invention is to provide an information storage mechanism wherein one or more banks of electrical switches can be brought into operative contact with coded information racks of an accounting machine for setting switches to correspond to mechanically coded information through a control selectively operating in response to a predetermined accounting machine program.

A further object is to provide a mechanism responsive to an accounting machine program for selectively raising and lowering separate banks of electrical switches into operative relation with coded mechanical conditions, such mechanism operating to control the banks individually or together.

In general these objects are attained by causing the contacts of switches to assume positions corresponding to the selected mechanical positions of parts of the accounting machine, thus making it possible to read-in information which can be read-out at once, or stored until needed. Reading is accomplished by placing an electrical potential on selected contacts to generate an electrical output. This electrical output may be used to indicate to some possibly remotely located apparatus the exact position of the elements in the original apparatus so that the remote unit is caused to be operated in exact correspondence with the machine supplying the original electrical or mechanical information.

Figure 1:
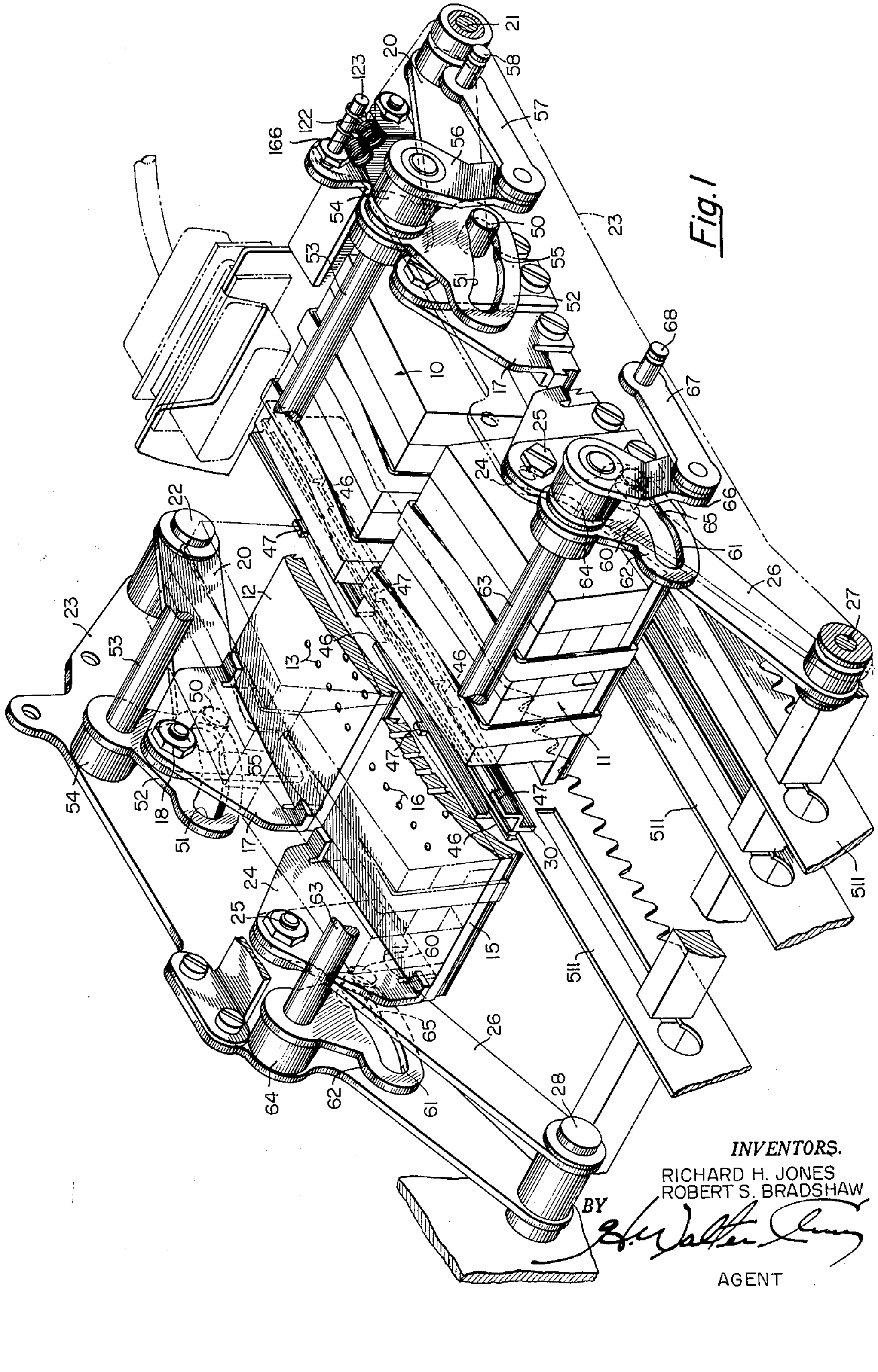
FIG. 1 is a fragmentary perspective view, with parts broken away, of two juxtaposed switch banks for information storage ready for assembly with a selective control mechanism embodying one form of the present invention.

Referring to the drawings and more particularly to FIG. 1, for the introductory description of the assembly to which the invention relates, two banks 10 and 11 of read-out switches are shown arranged in juxtaposed spaced relation. Switch bank 10 has a base plate 12 of insulating material provided with a series of perforations 13 through which extend the operating plungers of the mounted switches for selection in accordance with coded positions of the actuating racks 511 of the accounting machine with which the read-out unit assembly is associated. Switch bank 11 also has a base plate 15 of insulating material provided with a series of perforations 16 through which extend the operating plungers of its mounted switches, for selection in accordance with coded positions of actuating racks 511.

Figure 11:
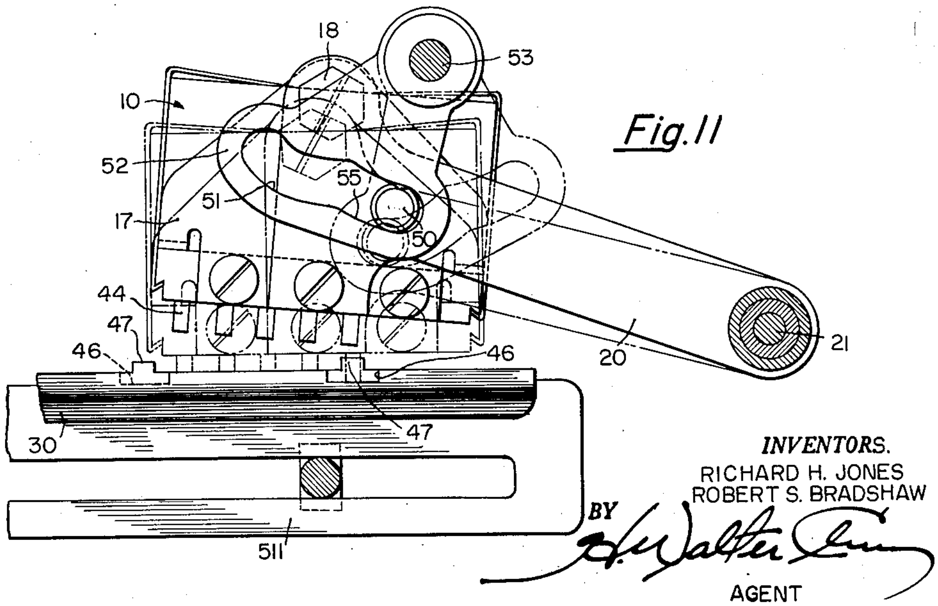
FIG. 11 is a section view on line 11—11 of FIG. 7.

The base plate 12 extends transversely of the assembly and is supported at opposite ends respectively by upstanding hangers 17, each suspended by a bolt 18 from a rock arm 20 (FIG. 11). These rock arms 20 are respectively pivotally carried by stub shafts 21 and 22 (FIG. 1) which project inwardly respectively from the side frames 23 of the machine. Similarly base plate 15 is supported at opposite ends respectively by upstanding hangers 24, each suspended by a bolt 25 from a rock arm 26. These rock arms 26 are respectively pivotally carried by stub shafts 27 and 28, which project inwardly respectively from the said side frames 23.

In the present instance switch bank 10 functions as storage for information, illustratively, transmitted from the multiplier of the associated accounting machine, while the switch bank 11 functions as storage for information illustratively transmitted from the multiplicand of the accounting machine. Further switch bank 10 comprises a plurality of decimal switches and switch bank 11 comprises a plurality of duodecimal switches. Each bank of switches is separately controlled to swing independently or together to an elevated inoperative or lowered to an operative position for selection by coded strips 30 carried respectively by the aforesaid actuator bars 511.

Figure 9:
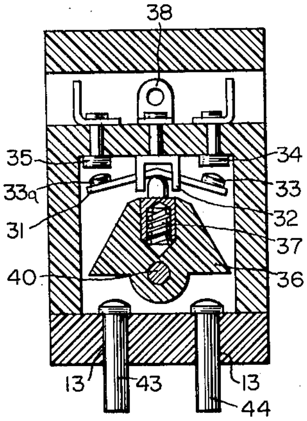
FIG. 9 is a sectional view of one switch as illustrative of all such switches on a switch bank.
Figure 10:
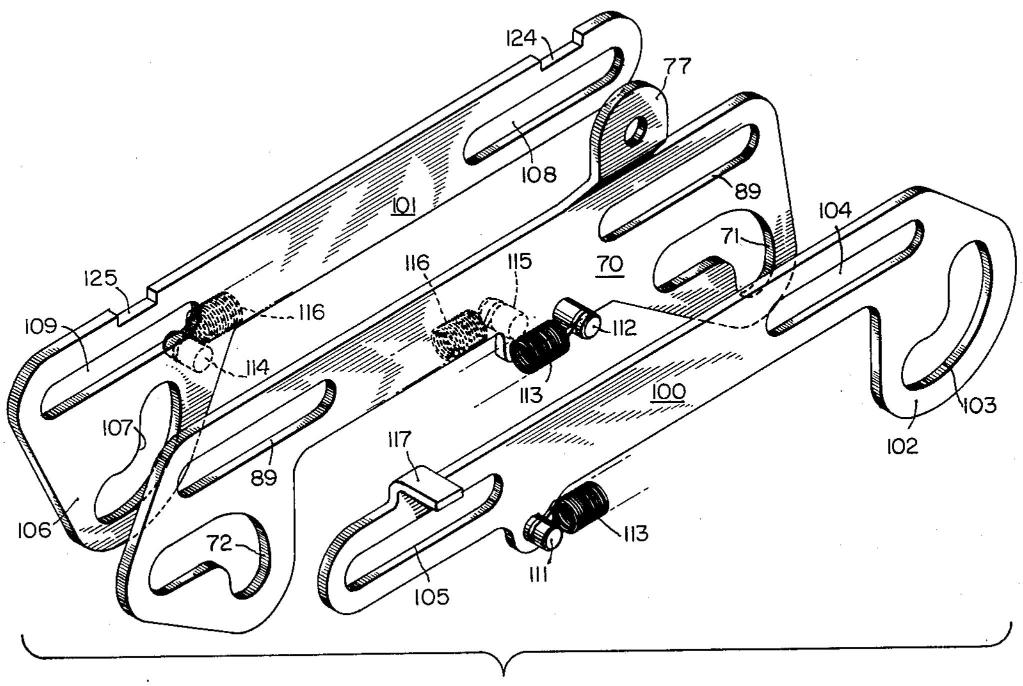
FIG. 10 is an exploded perspective view of the slide control mechanism.

In order to understand the operation of the switches and the manner in which temporary or indefinite storage may be provided, reference is now had to FIG. 9 wherein one form of decimal switch is shown, complete details of which are described in the copending application of William W. Deighton et al., entitled "Data Storage Read-out and Transfer Apparatus," Serial No. 492,232, filed March 4, 1955, now Patent No. 2,914,759, issued November 24, 1959. In the present storage unit assembly there are five individual switches mounted in each unit, each having a transversely disposed conductive contactor 31 which is pivotally mounted for rocking movement, by means of a double fulcrumed pedestal 32, to swing one or the other of its contactors 33 or 33a into circuit closing relation with one or the other of two fixed contacts 34 and 35, both of which have extensions as outputs to two external circuits. Selective positioning of the rockable contactor takes place through the medium of an actuator 36 having a spring biased element 37 bearing medially thereagainst and in vertical alignment with the circuit input post 38 which is conductively connected to the pedestal 32. The actuator 36 is pivoted at 40 internally of the unit and has oppositely disposed shoulders 41 and 42, respectively in the path of movement of two operating plungers 43 and 44 which protrude through the base perforations for that switch. It is these plungers 43 and 44 which are selectively operated by the coded strips 30 to shift contactor 31 from one stable position to the other. In the present instance each switch bank 10 or 11 comprises multiple blocks of these switch units arranged in side-by-side abutting relation suitably strapped in place with the pairs of plungers projecting through the perforations 13 and 16 respectively of the supporting base plates 12 and 15.

For selecting and closing a switch to correspond to a numeral selected by the accounting machine a sensing means, such as shown in the aforementioned pending application, is employed comprising a pair of the coded strips 30 attached to each of the actuator racks 511. Along the top edge of each strip 30 there is a notch 46 and a projection 47 spaced lengthwise therealong, with the notch 46 of one strip opposite the projection of the other strip. The coded arrangement of the projections and notches precisely conforms to the numeral selected on the keyboard of the accounting machine. When racks 511 reach their set position the selected numeral projection lies in the path of the its switch plunger as the bank of switches lowers in proper timed relation and so swings the select switch or switches to closed position, thereby setting up a stored condition representative of that particular number selection.

In particular accordance with the present invention and for the purpose of shifting the two banks of switches towards and away from operative relation to the coded slides, a novel mechanism has been devised for individually or simultaneously moving the banks according to conditions.

Referring now to FIGS. 1 and 11 it will be seen that the means for shifting switch bank 10 comprises two pins 50 attached to the respective rock arms 20, projecting outwardly to ride in its arcuate cam slot 51 formed in its shift arm 52 which is keyed or otherwise made fast to a rock shaft 53. Shaft 53 extends transversely across the assembly with its ends riding respectively in bearings 54 of frame 23. It should be noted that one end portion 55 of each slot 51, which supports the pins 50 in elevated position of the bank, is concentric to the axis of rotation of rock shaft 53, while the remaining portion is formed to lower the rock arms 20 of bank 10, as the pins 50 are cammed downwardly during the operating cycle. Rocking movement of the shaft 53 is controlled by swinging an arm 56 keyed thereto with its free end pivotally attached to a link 57 from which an operating pin 58 projects outwardly.

Still referring to FIG. 1 the means for raising and lowering the switch bank 11 like the bank 10, comprises two pins 60 attached to the respective rock arms 26, to ride in arcuate cam slots 61 formed in the respective shift arms 62 which are keyed to the common rock shaft 63 adjacent its ends. This rock shaft 63 extends transversely across the assembly parallel to shaft 53 with its ends journalled in bearings 64 of the frame 23. End portion 65 of each cam slot 61 is concentric to the axis of rotation of rock shaft 63, such portions defining the position of the pins 60 to hold bank 11 elevated, while the remaining portions function to cam pins 60 downward and thereby rock the arms 26 to lower the bank 11 to switch operating position. Rocking movement of shaft 63 is controlled by the swing of an arm 66 keyed thereon and having its free end pivotally attached to a link 67 from which an actuating pin 68 projects outwardly.

From the foregoing it will be understood that movement of pin 58 will cause raising and lowering of switch bank 10, while movement of pin 68 will cause raising and lowering of switch bank 11. In accordance with a feature of the invention both pins 58 and 68 are arranged to be actuated by a mechanism whereby each bank of switches can be independently lowered or both banks lowered together. In the assembly as shown in FIG. 1 both links 57 and 67 are positioned to hold both banks elevated, that is with the pins of the switches out of the path of movement of racks 511, and the respective actuating pins 58 and 68 lie substantially in the same plane.

For the purpose of selectively controlling the movement of pins 58 and 68, and with reference to FIGS. 2, 3, 5 and 10, an actuating slide 70 is provided having substantially inverted L-shaped cam slots 71 and 72 respectively in its opposite ends in the former of which the pin 58 rides, and in the latter the pin 68 rides. The slide 70 is arranged to be reciprocated, in response to the operation of a function selection program unit connected to the accounting machine, by a rock lever 73 pivoted at 74 to an extended side frame 75, and attached at its upper end to a pivot 76 of an ear 77 formed on the slide 70 to transmit motion thereto. The lever 73 carries a cam roller 78 projecting from one side of one of its arms above pivot 74 to ride against the periphery of a cam 79 and also carries a second cam roller 81 projecting from the opposite side of the other lever arm below pivot 74 to ride against the periphery of a second cam 82. Thus, roller 78 has an arcuate path above pivot 74, and roller 81 has an arcuate path below the pivot. The configuration of cams 79 and 82 are such that their associated rollers 78 and 81 move slide 70 equally in both directions. For supporting and guiding slide 70 it is formed with guide slots 89 at opposite ends in which support pins 49 and 59 ride. These pins 49 and 59 are fixed to and project laterally from the side frame 23 on that side of the assembly.

Figure 3:
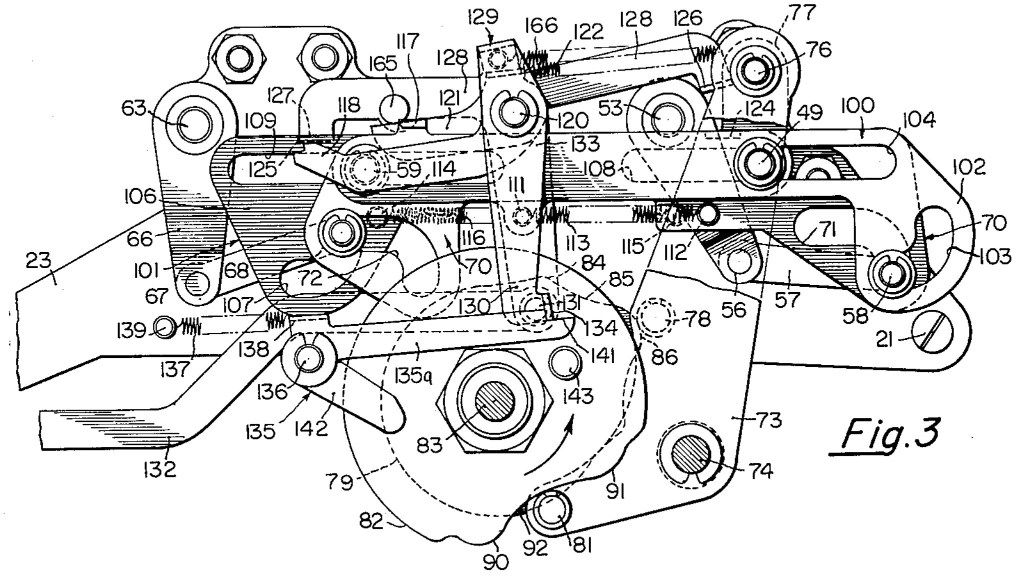
FIG. 3 is a side elevation showing the position of the mechanism of FIG. 2 when the right or rear hand switch bank has been moved to switch setting position.
Figure 4:
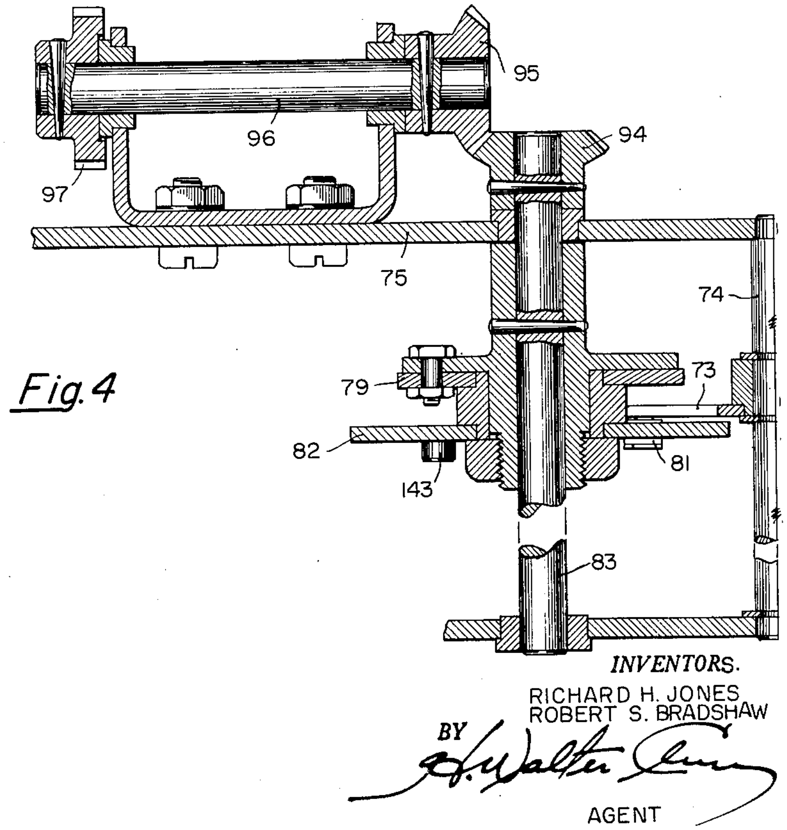
FIG. 4 is a section view on line 4—4 of FIG. 2 with parts broken away.

In order to precisely coordinate the operation of cams 79 and 82 with the functional programming of the acmounting machine rack bar 511, the two cams are complementally shaped and keyed to a driven shaft 83 (FIG. 4) with the respective cam surfaces so spaced circumferentially that each revolution thereof rocks lever 73, both clockwise and counterclockwise as seen in the drawings, with the combined movements causing slide 70 to reciprocate. To accomplish this and as seen in FIG. 3, the surface of cam 79 is formed with a leading lobe 84 followed by a concave recess 85 which terminates in an arcuate lobe 86 projecting radially further than lobe 84. Likewise, the contour of the cam 82 comprises lobes 90 and 91 and arcuate recess 92, the latter cooperating with lobe 86 on cam 79 to control slide 70 to hold the actuating slide 70 stationary during the relatively short interval rack bars 511 are reversing direction. As clearly shown in FIG. 4 the driven shaft 83 is suitably journalled in the machine frame and has a bevel gear 94 keyed thereon in mesh with a like gear 95 on a stub shaft 96 arranged to receive power from a gear 97 which is driven from a counter shaft of the machine, not shown.

In order to transmit the motion of slide 70 to the control mechanism for raising and lowering switch banks 10 and 11, in a predetermined manner, two auxiliary slides 100 and 101 (FIG. 10) are arranged in face to face relation respectively with the sides of slide 70. The auxiliary slide 100 forms the control for switch bank 10 and slide 101 forms the control for switch bank 11, see FIG. 1.

Control slide 100 has an elongated body terminating at one end in a depending actuating offset 102 having a generally arcuate cam slot 103 in which control pin 58 rides to transmit motion of the actuator slide 70 for selected operation of its switch bank 10. The body of slide 100 is supported at opposite ends for linear travel on the two fixed pins 49 and 59 which ride respectively in guide slots 104 and 105. Pins 49 and 59 are the same pins upon which the actuator slide 70 is supported for linear travel.

Control slide 101 has an elongated body terminating at one end in a depending actuating offset 106 having a cam slot 107 in which control pin 68 rides to transmit motion of slide 70 for selected operation of switch bank 11. The body of slide 101 is supported at opposite ends on pins 49 and 59 which ride respectively in guide slots 108 and 109 for linear travel of the slide 101 as transmitted from slide 70.

For restoring the respective slides 100 and 101 to the position where both switch banks 10 and 11 are elevated, slide 100 has a lug 111 projecting laterally therefrom to lie in the horizontal plane of a lug 112 projecting laterally from slide 70 when the two slides are in operative face to face relation. A coil spring 113 is stretched between the alined lugs 111 and 112 to bias slide 100 to its inoperative position. Similarly, slide 101 has a lug 114 projecting laterally therefrom to lie in the horizontal plane of a lug 115 projecting laterally from the side of the slide 70, opposite to the lug 112, when the two slides are in operative face to face relation. A coil spring 116 is stretched between the alined lugs 114 and 115 to bias the slide 101 to its inoperative position.

In order to retain both slides 100 and 101 latched in inoperative position, or one of the slides latched while the other follows the movement of actuator slide 70, slide 100 is provided with a dog 117 projecting outwardly from the slide end adjacent slot 105 into the path of the notched end of a detent 118 which is pivoted upon a stud 120 attached to the side frame 23.

Figure 8:
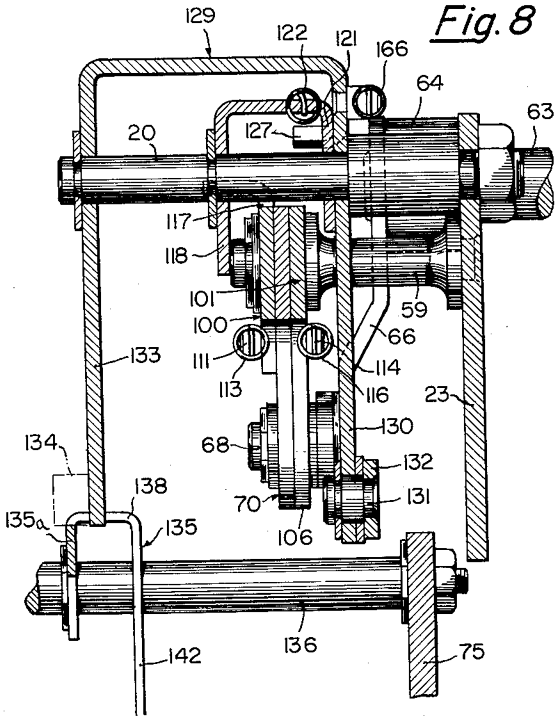
FIG. 8 is a section view on line 8—8 of FIG. 2.

In the present instance dog 117 is struck from the slide material and bent laterally for proper alignment with the detent 118 which is of inverted U-shape to straddle the three slides (FIG. 8) to provide a finger 121 by which the detent is released as will presently be described. The detent 118 is biased to latching position by a coil spring 122 stretched from it to a fixed structure. The latching control for slide 101 comprises two notches 124 and 125 respectively adjacent the ends of the slide but spaced radially on opposite sides of pivot stud 120, to be respectively engaged by interfitting latch offsets 126 and 127. These offsets project laterally from opposite ends of a control rock arm 128 medially fulcrumed upon the pivot stud 120, such arm 128 being an integral part of an inverted U-shaped body 129 which straddles the assembly of the slides, in which regard see FIG. 8. One leg 130 of this body terminates in a pivotal connection 131 with a control link 132 and the other leg 133 terminates in a laterally projecting stop 134 which seats upon one arm of a bifurcated bell crank 135. The bell crank is mounted to rock upon a fixed pivot 136 and is biased upwardly towards the stop 134 by a coil spring 137 stretched between an abutment 138 on arm **135*a* and a fixed pin 139. The free end of arm 135*a* terminates in an upwardly opening notch 141 which is for the purpose of receiving the stop 134 to latch slide 101 while slide 100 completes its switch bank operating cycle. The other arm 142 of this bell crank lever overlies the outer face of cam 82 in the path of a pin 143 on cam 82** to reset the bell crank for another slide selection as determined by the selected program pin.

For reciprocating link 132 to rock the slide control body 129 in timed relation to program selected pins, it is pivotally connected to one arm 144 of a bell crank, the other arm 145 of which has its free end terminating in the path of movement of a pickup member 146 (FIGS. 2 and 12) carried by a cam controlled rock lever 147. The bell crank is pivoted on a pin 148, projecting from the side frame 75, and is maintained in normal rest or inoperative position by a stop 150 disposed below arm 145 and also projecting from the side frame 75. The opposite end of control lever 147 terminates in an angular offset 151 having a linear slot 152 in which a fixed guide pin 153 rides as the lever is rocked. Also this end of the lever 147 has an ear 154 supporting a pin 155 upon which two discs 156 are mounted to straddle the linearly movable tappet 157 of the program unit of the accounting machine. The tappet 157 is arranged to be stopped by a selected pin 158 of the program unit, in position for related setting of the rock lever 147. Details of this mechanism and control are fully described in co-pending application of Banik et al., Serial No. 492,266, filed March 4, 1955, now Patent No. 2,836,355, issued May 27, 1958, or reference may be had to FIGS. 152 through 160 and the description thereof beginning at column 160 of the specification of the Butler Patent 2,629,549.

Lever 147 has a medially located roller 160 riding on the periphery of a timing cam 161 received on a driven shaft 162 to be held in contact by a coil spring 163 stretched between a fixed point and a pin 164 located on lever 147 on the opposite side of the fulcrum from pin 153. Cam 161 rotates in synchronism with cams 79 and 82.

Figure 12:
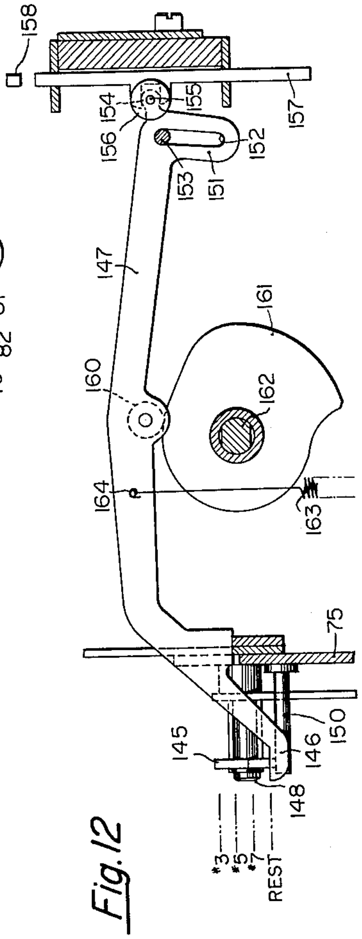
FIG. 12 is a side elevation view of a control unit.

As shown in FIG. 12 the selector control unit is shown in full lines in neutral position and in dotted lines in a position effected by a #3 program pin of the accounting machine and wherein cam 161 has lifted lever 147 to, in this instance, give the maximum stroke of link 132 for proper latch control of slide 101 as slide 100 returns.

With the program selection control in neutral position both switch banks 10 and 11 are elevated, and the operation of the control and associated slides will now be described as selected according to a #3 program pin, see FIGS. 2, 3 and 12. Cam 161 has a relatively rapid initial rise for quick release of the proper slide latches, its final dwell position at one hundred and eighty degree turn being determined by the stopping of the slotted offset 151 by the set tappet 157. The upward movement of pick-up 146 rocks the bell crank arms 145 and 144 to propel link 132 on its working stroke (FIG. 3) thereby to rock lever body 129 and transmit counter-clockwise turning of the rock arm 128. This rocking of arm 128 lowers lug 165 into contact with finger 121 which is rocked to unlatch detent 118 from dog 117 whereupon pin 58 for actuator slide 70 causes slide 100 to follow slide 70 and through link 57, arm 56 and shaft 53 switch bank 10 is lowered. Also this rocking of arm 128 withdraws offset 126 from its notch 124 at one end of slide 101 and lowers offset 127 into notch 125 at the other end of slide 101. This latching arrangement holds slide 101 stationary while slide 100 is moving to effect lowering of bank 10 to switch setting position. For the #3 pin control link 132 has a maximum working stroke to position stop 134 in register with notch 141 where it is snapped into latching position by the biasing spring 137 of bell crank 135. With bank 10 in switch setting position, cams 161, 79 and 82 continue rotating another half revolution during which slide 100 is restored while stop 134 maintains the latching of offset 127 with slide 101 so that the latter is held stationary. Also cam 82 at the end of this half cycle brings pin 143 to the position to pick-up bell crank arm 142 and rock the other arm 135 to disengage notch 141 from stop 134 whereupon U-shaped body 129 is restored by biasing spring 166. Spring 166 is stretched between the top of body 129 and post 123 for this purpose.

The foregoing describes the actuating cycle for raising and lowering the switch bank 10, an operation which functions only when a #3 program pin is set for selection.

Figure 2:
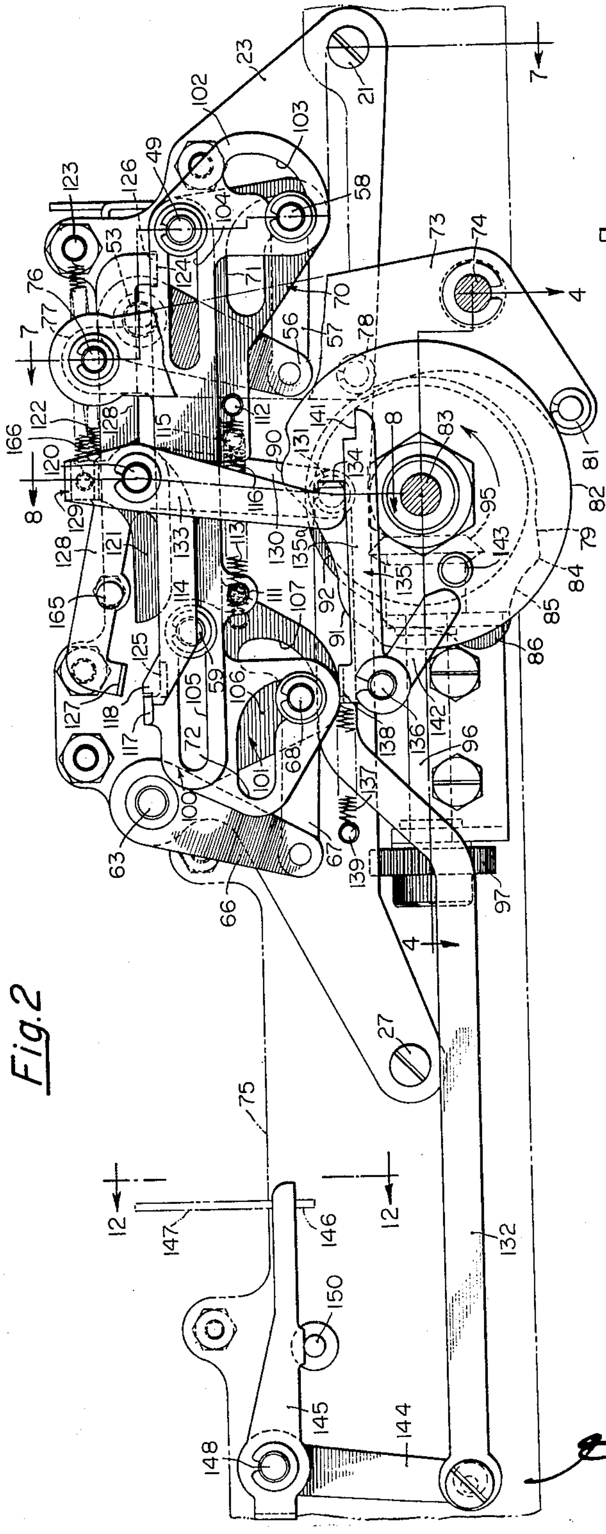
FIG. 2 is a side elevation of the control mechanism for the switch banks showing the parts in position corresponding to the elevated positions of both switch banks.
Figure 5:
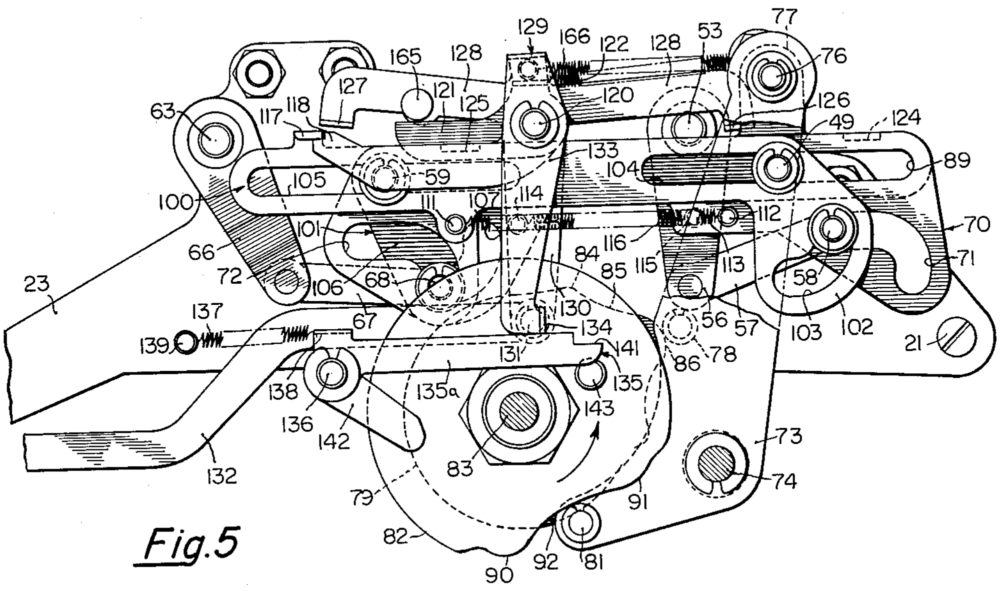
FIG. 5 is a view similar to FIG. 3 but showing the position of the mechanism when the front read-out, left hand switch bank has been moved to switch setting position.

Now with reference to FIGS. 2, 5 and 12, raising and lowering of the switch bank 11 takes place in response to the selection of a #7 pin of the accounting machine program and since this pin is shorter than a #3 pin tappet 157 is stopped in a position in which the lever 147 rocks the control bell crank 145 to produce a shorter stroke of the link 132. In this situation the working stroke of link 132 is just sufficient to rock latch arm 128, and release offset 126 from notch 124 of slide 101 but is not rocked far enough for lug 165 to shift finger 121. Therefore, detent 118 remains in latching position in front of dog 117 holding slide 100 stationary while the unlatched slide 101 is moved with slide 70 as actuated by the cams 78 and 82. Obviously, as seen in FIG. 5, the shortened stroke of link 132 does not bring stop 134 into register with notch 141 of bell crank 135, because such supplemental latching is not unnecessary because slide 100 remains latched during reciprocation of the connected slides 101 and 70. As the actuating slide 70 moves to the right, pin 68 carries slide 101 with it, thereby causing link 67 to rock bank control arm 66 to lower bank 11 to switch setting position. Since slide 100 is latched by detent 118, pin 58 rides up in slots 71 and 103 without linear travel and therefore link 57 and arm 56 do not move and switch bank 10 remains elevated.

Figure 6:
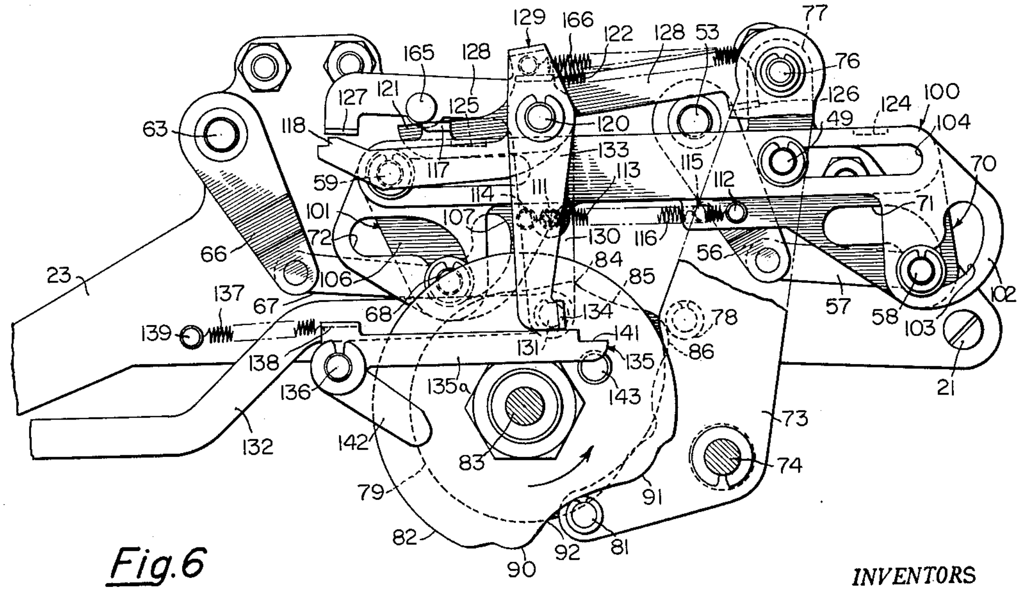
FIG. 6 is a view similar to FIGS. 3 and 5 but showing the position of the mechanism when both switch banks have been moved to switch setting position.
Figure 7:
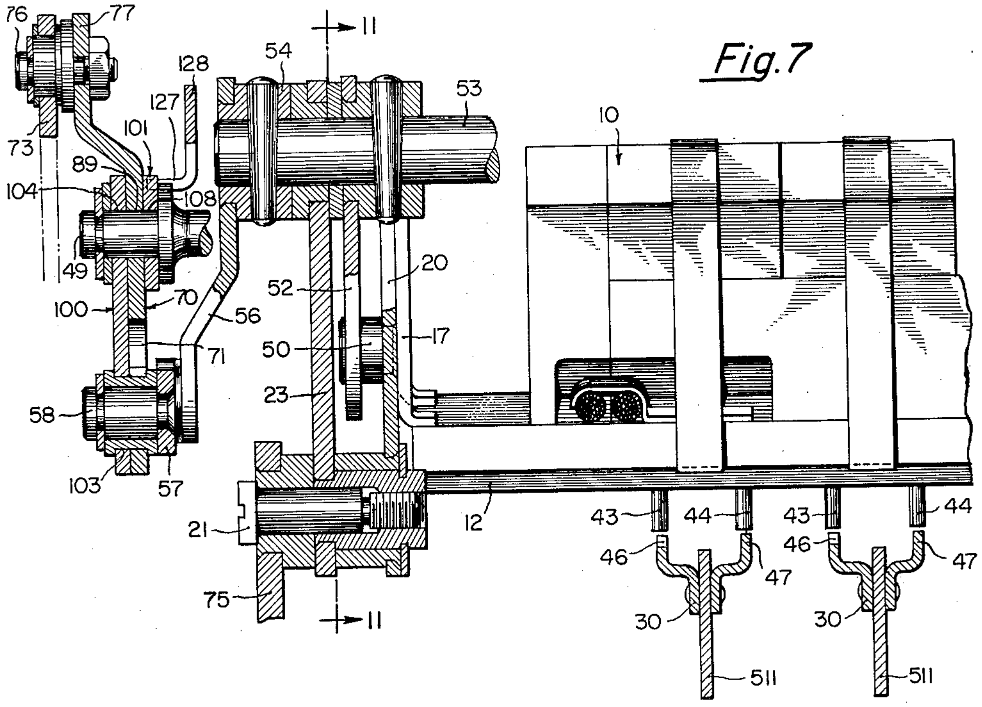
FIG. 7 is a section view on line 7—7 of FIG. 2.

Referring now to FIGS. 2, 6 and 12, when the program control of the accounting machine calls for both switch banks 10 and 11 to lower together to set both multiplier and multiplicand switches, a #5 pin becomes the selector to limit the rise of tappet 159, and in such condition selector lever 147 positions bell crank 145 so that the working stroke of link 132 is longer than its stroke for a #7 pin but shorter than for a #3 program pin. As a result of this new length stroke of link 132, arm 128 is rocked to release offset 126 from notch 124 in slide 101, and brings lug 165 down to unlatch detent 118 from dog 117 but halts the rocking movement before offset 127 can enter notch 125 in slide 101. Thus, both pins 58 and 68 move linearly, so that pin 58 draws link 57 and arm 56 to the right to lower switch bank 10, and pin 68 draws link 67 and arm 66 to the right simultaneously to lower switch bank 11.

It will thus be seen that a novel control is provided for selectively actuating switch bank 10 and switch bank 11 or both banks simultaneously, all such control being independently responsive to a predetermined set pin of an accounting machine program. Illustratively, three program pins determine by selection the lowering of switch banks and the actuating of an operating slide mechanism capable of assuming positions corresponding to the selected program pin. Such slide mechanism includes a plurality of slides and respective latching means, this latter being responsive to the reciprocation of a latch release link having working strokes respectively related to the selected program pin. In the present instance the link stroke varies between a maximum and a minimum for independent operation of either one of two switch banks and an intermediate stroke for simultaneous operation of both switch banks.

What is claimed is:

1. A storage data read-out unit for assembly with an accounting machine of the type having a plurality of reciprocable rack bars including means for coding mechanical conditions determined by the setting position of the rack bars, comprising two banks of electrical switches, pivoted means mounting said banks respectively for movement towards and away from operative relation with said coding means, means including a reciprocable slide for operating the mounting means of one of said banks, means including a reciprocable slide for operating the mounting means of the other of said banks, a reciprocable actuator member, means for latching each slide against movement with said actuating member, means responsive to a selected program of the accounting machine for unlatching said slides, means for reciprocating said actuating member, and means for transmitting the movement of said actuator member to said unlatched slides, whereby both mounting means shift the banks to operative position to close any switch corresponding to the setting of the rack bars as determined by a mechanical condition in the accounting machine.

2. Apparatus according to claim 1 wherein said means for reciprocating the actuating member initially accelerates for unlatching operation.

3. A mechanism according to claim 1 wherein the means for reciprocating the actuating member includes means arresting the reciprocable means while a bank is in switch setting position.

4. Apparatus according to claim 3 wherein the reciprocating means in a pair of cams and the arresting means are dwells respectively on said cams in alined relation.

5. A data storage and read-out unit for assembly with an accounting machine of the type having a plurality of reciprocable rack bars including means for coding mechanical conditions determined by the setting position of the rack bars, comprising two banks of electrical switches, pivoted means mounting said banks respectively for movement towards and away from operative relation with said coding means, means including a reciprocable slide for operating the mounting means of one of said banks, means including a reciprocable slide for operating the mounting means of the other of said banks, a reciprocable actuator member, separate means for latching each slide against movement with said actuator member, means responsive to a selected program of the accounting machine for unlatching one of said slides, means for reciprocating said actuator member, and means for transmitting the movement of said actuator member to the unlatched slide, whereby the selected mounting means shifts its bank to operative position to close any switch corresponding to the setting of the rack bars as determined by a mechanical condition in the accounting machine.

6. A data storage and read-out unit according to claim 5 wherein the responsive means includes a reciprocable link having a stroke variable to selectively unlatch said slides according to the accounting machine program.

7. A data storage and read-out unit according to claim 6 wherein supplemental means coacts with said link to maintain the latched slide latched during the cycle of the unlatched slide.

8. A data storage and read-out unit according to claim 7, wherein means operates to release said supplemental means at the end of said cycle.

9. A data storage and read-out unit according to claim 8 wherein one slide has a notch and said arm has an offset to seat in said notch as the latching means.

10. A storage data read-out unit according to claim 8 wherein said arm has a laterally disposed lug and one slide has a dog and a coacting detent as the latching means, said detent being in the path of said lug to release the latch.

11. A data storage and read-out unit comprising two banks of electrical switches, means pivotally mounting said banks for respective contact with a set code unit to close switches corresponding to said code, means including a reciprocable slide for shifting one of said banks to contact position, means including a reciprocable slide for shifting the other of said banks to contact position, a reciprocable slide actuating member, means for reciprocating said member, means including a rock arm for latching one of said slides against moving with said actuator member, means for rocking said arm to release said latch means, means for transmitting the movement of said actuator member to said unlatched slide to shift one bank to contact position, means responsive to a selected program pin of an accounting machine for operating said release means, and means to restore said latching means at the end of a cycle of movement of the actuating member.

12. A storage data read-out unit comprising two banks for respective contact with a set code unit to close switches corresponding to said code, means including a reciprocable slide for shifting one of said banks to contact position, means including a reciprocable slide for shifting the other of said banks to contact position, a reciprocable actuating member, means for reciprocating said member, means for latching one of said slides against moving with said member, means for latching the other slide against moving with said member, means including a rock arm for releasing both latch means, and means responsive to a selected program pin of an accounting machine for operating said release means whereby both banks are shifted to contact position, and means to restore said latching means at the end of a cycle of movement of the actuating member.

13. A data storage and read-out unit comprising two banks of electrical switches, means pivotally mounting said banks for respective contact with a set code unit to close switches corresponding to said code, means including a reciprocable slide for shifting one of said mountings to bring its bank to contact position, said slide having two linearly alined guide slots and an offset having a cam slot, means including a reciprocable slide for shifting the other of said mountings to bring its bank to contact position, said second slide having two linearly alined guide slots and an offset having a cam slot, a reciprocable slide actuating member disposed between said two slides, said member having two linearly alined guide slots and two end offsets respectively having cam slots, said member cam slots being respectively reversed with respect to the cam slot of the adjacent slides, the guide slots at the ends of the slides being respectively in register, a fixed guide pin traversing each set of registered slides, means for reciprocating said actuating member, a motion transmitting pin traversing the registered cam slots of the actuation member and one slide, a second motion transmitting pin traversing the registered cam slots of the actuating member and the second slide, means for latching both driven slides against movement with said member, and means responsive to a selected pin of an accounting machine program for selective releasing said latching means, whereby the bank mounting means is selectively operated.

14. A data storage and read-out unit for accounting machines of the type having a plurality of differentially movable members each including means for respectively coding mechanical conditions determined by the setting position of said members comprising, two banks of electrical switches, means mounting said banks of switches for movement to and from operative engagement with said coding means after said movable members have been moved to their set positions, each switch bank having rows of multi-position switches corresponding to the number of said movable members, each of said switches having multiple stable switch positions, each of said rows having means for selective switch closing to a selected one of its stable positions from a previously set stable position corresponding to the setting of one of said movable members determined by a mechanical condition in the accounting machine, and means responsive to selected program operations of the accounting machine for moving said switch banks either singly or together to operative switch setting position wherein said selective switch closing means may contact the coding means on said movable members thus to effect said switch closing from one of said stable conditions to the other.

15. A storage data and read-out unit for an accounting machine of the type having a plurality of differentially movable members each including means for respectively coding mechanical conditions determined by the setting position of said members, comprising two banks of electrical switches, means mounting said banks of switches respectively for movement toward and away from operative relation with said coding means after said movable members are set in their coding positions, each bank of switches comprising rows of multi-position switches corresponding to the number of said movable members, each of said switches having multiple stable switch positions, each of said rows having means for selective switch closing to a selected one of its stable positions from a previously set stable position corresponding to the setting of one of said movable members determined by a mechanical condition in the accounting machine, and means responsive to any one of three accounting machine programs for selectively shifting said banks to corresponding operative switching positions whereby two banks can be shifted together or either bank shifted independently.

16. A data storage and read-out unit for assembly with an accounting machine of the type having a plurality of differentially movable elements including means for respectively coding mechanical conditions determined by the setting position of said elements, comprising two banks of electrical switches, pivoted means mounting each of said banks respectively for movement toward and away from operative relation with said coding means, each bank having rows of switches corresponding to the number of said elements, each of said rows having means for selective switch closing corresponding to the setting of one of said elements determined by a mechanical condition in the accounting machine, and means responsive to one selected program operation of the accounting machine for actuating one pivoted means to shift the front bank to operative switch positions, and to another selected program operation of the accounting machine to actuate the other pivoted means to shift the rear bank to operative switch positions.

17. A construction in accordance with claim 16 and further including means responsive to still another selected program operation of the accounting machine to actuate both pivoted means to shift both the front and rear bank to operative switch positions simultaneously.

References Cited in the file of this patent

UNITED STATES PATENTS

| | | |
|---|---|---|
| 1,928,656 | Von Reppert | Oct. 3, 1933 |
| 2,285,353 | Peirce | June 2, 1942 |
| 2,295,518 | Meuer | Sept. 8, 1942 |
| 2,332,755 | Robertson et al. | Oct. 26, 1943 |
| 2,493,709 | Wittenmeyer | Jan. 3, 1950 |
| 2,550,133 | Allan | Apr. 24, 1951 |
| 2,755,993 | Christian et al. | July 24, 1956 |

FOREIGN PATENTS

| | | |
|---|---|---|
| 690,171 | Great Britain | Apr. 15, 1953 |

UNITED STATES PATENT OFFICE
CERTIFICATION OF CORRECTION

Patent No. 3,007,631 November 7, 1961

Richard H. Jones et al.

It is hereby certified that error appears in the above numbered patent requiring correction and that the said Letters Patent should read as corrected below.

Column 8, line 65, after "banks" insert -- of electrical switches, means pivotally mounting said banks --.

Signed and sealed this 24th day of April 1962.

SEAL)
Attest:

STON G. JOHNSON
Attesting Officer

DAVID L. LADD
Commissioner of Patents